(12) United States Patent
Block et al.

(10) Patent No.: US 6,446,400 B1
(45) Date of Patent: Sep. 10, 2002

(54) ANTI-VEGETATION TILE SYSTEM

(75) Inventors: Howard V. Block, Johnston; Anthony W. Bradley, Humboldt, both of IA (US)

(73) Assignee: Welch Products, Inc., Carlisle, IA (US)

( * ) Notice: Subject to any disclaimer, the term of this patent is extended or adjusted under 35 U.S.C. 154(b) by 0 days.

(21) Appl. No.: 09/540,379

(22) Filed: Mar. 31, 2000

(51) Int. Cl.[7] ............... A01M 21/00; E01H 11/00
(52) U.S. Cl. ............................. 52/102; 47/32
(58) Field of Search ................ 52/102; 47/9, 33, 47/32, 32.4

(56) References Cited

U.S. PATENT DOCUMENTS

| | | | |
|---|---|---|---|
| 2,662,343 A | * 12/1953 | Rice | |
| 4,349,989 A | * 9/1982 | Snider, Jr. | 47/33 |
| 5,285,594 A | 2/1994 | Penny | |
| 5,323,557 A | * 6/1994 | Sonntag | 47/25 |
| 5,379,558 A | 1/1995 | Mason, III | |
| 5,389,116 A | * 2/1995 | Byrd | 47/9 X |
| 5,509,231 A | 4/1996 | Marcoux | |
| 5,522,176 A | * 6/1996 | Suttle | 47/25 |
| 5,586,753 A | 12/1996 | Michiaels | |

FOREIGN PATENT DOCUMENTS

| | | | |
|---|---|---|---|
| DE | 19958581 A1 | * | 6/2001 |
| JP | 08068022 A | * | 3/1996 |
| JP | 409302638 A | * | 11/1997 |

* cited by examiner

Primary Examiner—Peter M. Poon
Assistant Examiner—Jeffrey L. Gellner
(74) Attorney, Agent, or Firm—Henderson & Sturm LLP

(57) ABSTRACT

An anti-vegetation system for retarding growth around a structure extending from the ground includes a plurality of mats. A first mat includes at least one predefined scoring pattern to accommodate the shape of the structure extending from the ground. A plurality of scoring patterns can be included to accommodate a variety of shapes and sizes. When a scoring pattern it utilized, and the corresponding portion optionally removed, the mat can be positioned on the ground and partially around the structure extending from the surface. A second mat is positioned adjacent to the first mat and effectively surrounds the structure extending from the ground. Additional mats can be placed adjacent to the first and the second mat to increase the size of the protected area. Adjacent edges can utilize corresponding outwardly extending lips to improve the sealing efficiency of the edge-to-edge regions.

19 Claims, 3 Drawing Sheets

ANTI-VEGETATION TILE SYSTEM

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates generally to anti-vegetation tiles, mats and systems and more specifically to an anti-vegetation system utilizing multiple mats or tiles to surround structures extending from the ground such as signs and posts. In a preferred embodiment the system utilizes tiles and mats which are composite molded articles.

2. Description of the Related Art

Those concerned with these and other problems recognize the need for an improved system for controlling vegetation around various structures which extend from the ground. This need is particularly evident in the areas alongside roads and highways which are replete with signs and posts.

A variety of solutions for controlling the vegetation surrounding posts and signs have been suggested. The desire to control such vegetation growth is significant since mowers are typically not capable of mowing sufficiently close to signs and posts and trimming around each post is time consuming and, therefore, expensive, Alternatively, permitting vegetation around signs and posts to grow unabated is a aesthetically undesirable and in many cases can impair the sight distance of motorists.

The obvious solution to controlling the vegetation growth around signs and posts is to prevent the vegetation from growing in the first place. Attempts to prevent the vegetation growth have employed such methods as surrounding the posts with concrete, asphalt or other such "permanent" material and applying or spraying used oil, herbicides or other vegetation retardant solutions. Each of these methods have significant disadvantages. Utilizing concrete or asphalt is not only an expensive and time consuming approach, but it does not lead to the as permanent of a solution as had been hoped. Over time, the concrete and asphalt breaks up. The process is accelerated in climates which are subject to larger temperature extremes. Not only is the solution not permanent but the broken pieces can damage the mowers. The application of anti-vegetation solutions is only a temporary solution and is environmentally undesirable.

Alternative solutions have focused on the use of a relatively flat structure, such as a tile or a mat, which is positioned on the ground and prevents the growth of vegetation. Examples of these types of solutions can be seen in U.S. Pat. Nos. 5,285,594; 5,379,558; 5,509,231; and 5,586,753.

U.S. Pat. No. 5,285,594 disclose a "Weed Guard Cover System." The system utilizes two pieces which are slid together and equally surround the extending structure. The two pieces overlap one-another creating a surface which is not flat. However, it is preferred in the industry to implement a solution in which the surface remains flat to minimize any potential damage to mowers. Additionally, it is suggested that the pieces be secured to the ground and epoxied together to insure an adequate seam which will not permit vegetation growth. While the multi-piece system disclosed is reasonably suitable in the application as shown, it lacks the versatility for utilizing the same pieces to conform to a variety of structures and is overly cumbersome to install.

U.S. Pat. No. 5,379,558 disclose a "Ground Covering Mat for Ground Anchored Structure." This solution utilizes a single mat with a opening for surrounding the extending structure in the center. A slit is provided between the opening in the center and the outer edge allowing the mat to be place around the extending structure. Multiple perforated profiles exist in the center to accommodate various sized structures. The solution also works reasonably well but includes several significant disadvantages. Initially, it is recommended that the mat be anchored down which is labor intensive. Additionally, there exists the danger that the mat may become unanchored with the mat or anchoring pegs becoming potentially dangerous to the mowers used to mow the surrounding area. Also, the slit utilized to position the mat around the structure could allow for vegetation growth up through the slit. Finally, single mats with holes or apertures in the center can be difficult to install, especially for larger mats designed to cover larger areas.

U.S. Pat. No. 5,509,231 discloses a "Method or Retarding Vegetation Growth." This method utilizes a single mat with a center hole as described above. The same basic disadvantages as described immediately above exists for this solution as well. Additionally, the method optionally utilizes a flap positioned over the slit to prevent the vegetation growth through the slit. However, this flap make installation more labor intensive and eliminates the flat profile which is desirable.

U.S. Pat. No. 5,586,753 discloses a "Fence Vegetation Barrier." This system utilizes a series of overlapping flaps and is similar to the solution in U.S. Pat. No. 5,285,594 with the same basic disadvantages.

While all of the aforementioned prior art constructions are more than adequate for the basic purpose an function for which they have been specifically designed, they are uniformly deficient with respect to their failure to provide a versatile, efficient and economical solution to the problem of controlling vegetation growth around various structure extending from the ground.

As a consequence of the foregoing situation, there exists a need for a new and improved anti-vegetation system for controlling the vegetation growth around signs, posts and other such structures extending from the ground and the provision of such a system is a stated objective of the present invention.

BRIEF SUMMARY OF THE INVENTION

The present invention relates generally to anti-vegetation tiles, mats and systems and more specifically to an anti-vegetation system utilizing multiple mats or tiles to surround structures extending from the ground such as signs and posts. In a preferred embodiment the system utilizes tiles and mats which are composite molded articles.

The anti-vegetation system of the present invention utilizes multiple mats or tiles to retard or eliminate growth around structures extending from the ground such as signs or posts. At a minimum, two mats are used though additional mats can be used to increase the area of the ground covered.

In a preferred embodiment the mats are generally in a shape of a rectangle. Along one edge of the mat exists one or more predefined scoring patterns. The one or more predefined scoring patterns ideally accommodate the shape of the structure to be surrounded with a minimal gap between the mat and the structure. With multiple scoring patterns, the most common posts sizes and shapes can be accommodated.

After selecting and scoring the appropriate scoring pattern, and when necessary removing the inner scored portion, the mat can be placed on the ground and accommodate the extending structure. The scored pattern corresponds to a portion of the outer periphery of the structure extending from the ground.

The system of the present invention utilizes a second mat which is positioned adjacent to the first mat and completes the surrounding of the structure. The two adjacent mats effectively surround the extending structure and abate or eliminate vegetation growth around the structure. Additional mats can be placed adjacent to the first two to increase the ground coverage area.

In a preferred embodiment, each edge forming a seam between two adjacent mats includes an outwardly extending lip. The outwardly extending lips are configured such that the lips overlap one another. Still in a preferred embodiment, the overlap region maintains the same overall thickness relative to the individual mats.

In one embodiment of the present invention, outwardly extending lips are provided on two opposite edges of the mat. In another embodiment, all edges of the mat include outwardly extending lips.

In a preferred embodiment, a plurality of predefined score lines are included on the underneath side of the mat. Still in a preferred embodiment, in order to increase efficiency of manufacture and installation, all mats utilized in the system are identical in terms of shape, size, configuration and construction.

The construction of the mats can be comprised of a variety of materials but, preferably, the mats comprise a composite molded material utilizing a polyurethane material and recycled particulate material such as plastic, rubber, or the metal and fiber by-product of tire recycling commonly referred to as fluff.

Therefore, an object of the present invention is the provision of an improved Anti-Vegetation Tile System.

Another object is to provide an Anti-Vegetation Tile System utilizing multiple tiles or mats.

A further object is to provide an Anti-Vegetation Tile System which is versatile enough to be utilized with signs, posts and other structures extending from the ground which have a variety of shapes and sizes.

Another object of the present invention is to provide an Anti-Vegetation Tile System which is economical and efficient to install and maintain.

A further object of the present invention is to provide an Anti-Vegetation Tile System which can be easily adapted to cover ground areas of all various sizes.

A still further object of the present invention is to provide an Anti-Vegetation Tile System which is environmentally desirable.

Other objects, advantages, and novel features of the present invention will become apparent from the following detailed description of the invention when considered in conjunction with the accompanying drawings.

DETAILED DESCRIPTION OF THE INVENTION

Figure 1:
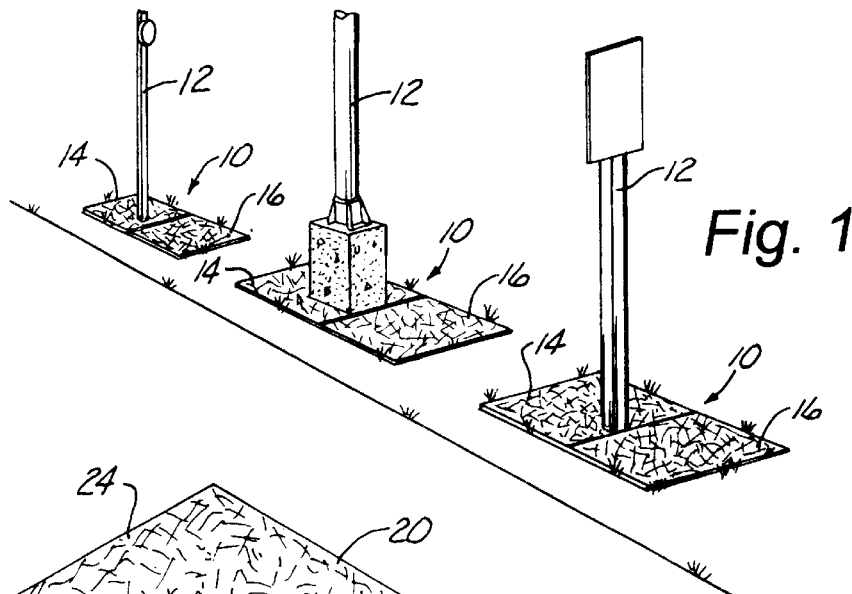
FIG. 1 is a perspective view of a series of posts protected by the anti-vegetation system of the present invention.

The present invention can be fully appreciated and understood in view of the following detail description and in view of the drawings wherein like reference numerals designate identical or corresponding parts throughout the several views. It should be understood that the following discussion is for illustrative purposes and that the invention can be practiced with modifications without materially departing from the novel teachings and advantages of this invention. Accordingly, all such modifications are intended to be included within the scope of this invention as defined in the following claims.

The present invention comprises a new and improved Anti-Vegetation Tile System for preventing or abating the growth of vegetation around structures extending from the surface such as posts or signs. Referring to FIG. 1, a series of systems (10) of the present invention are shown installed around a variety of posts (12). The system includes at least a first mat (14) positioned adjacent to a second mat (16).

In the system (10) of the present invention, a portion of the first mat (14) is cut, preferably along predefined score lines. If necessary, a portion of the mat (14) is removed. The cut portion of the first mat (14) permits the first mat (14) to partially surround the post (12) when the mat (14) is positioned on the ground. The second mat (16) is positioned on the ground adjacent to the first mat (14). With the two mats (14 and 16) positioned in the adjacent manner, the post (12) is effectively surrounded. No cutting is required on the second mat (16).

If larger ground area coverage is required or desired, additional mats can be positioned adjacent to the first mat (14) and second mat (16) in any and all directions in which coverage is desired.

With the first mat (14) and the second mat (16) positioned around the post (12), the post (12) is effectively surrounded at the ground level and vegetation growth will be retarded or eliminated. This will permit the safe and efficient mowing of the area with the posts without the need for labor and cost intensive trimming around the posts (12).

The system (10) of the present invention utilizing a plurality of mats is a significant improvement over the single mat systems disclosed in the prior art in at least two significant ways. First, the cutting for accommodating the extending structure occurs on the out edge of the mat instead of in the center. As a result, the cutting of the mats or tiles is significantly easier. Initially, it is simply easier to work, or cut, at the edge of the mat versus cutting in the center. By cutting at the edge, there is simply not the hassle of having to reach over and work around the border material of the mats with center openings. Additionally, there is less cutting which must occur in the present invention. In the mats with center opening, the entire profile of the extending structure must be cut and removed. In the present invention, only a portion of the profile must be cut and removed since the surrounding of remaining profile of the extending structure is accomplished with the edge of the second mat. With a square post, this results in a twenty-five percent reduction in material which must be cut.

Second installation of the system of the present invention is significantly easier than mats with center openings. Mats with center openings either require an access slit running from the outer edge of the mat to the center opening, which is then pulled open to allow the mat to be positioned around the extending structure, or require the installer to lift the mat over the top of the extending structure and slide the mat down to the ground. As will be discussed below, mats which are sufficiently weighty, and thereby thick, to eliminate the need for anchoring are preferred. However, this extra weight and thickness increases the difficulty in installing the mats with center openings. On the contrary, the mats of the present invention are simply laid on the ground with virtually no need for opening them up via a slit or sliding them over the top of the extending structure. The system of the present invention results in a much improved installation process.

Figure 2:
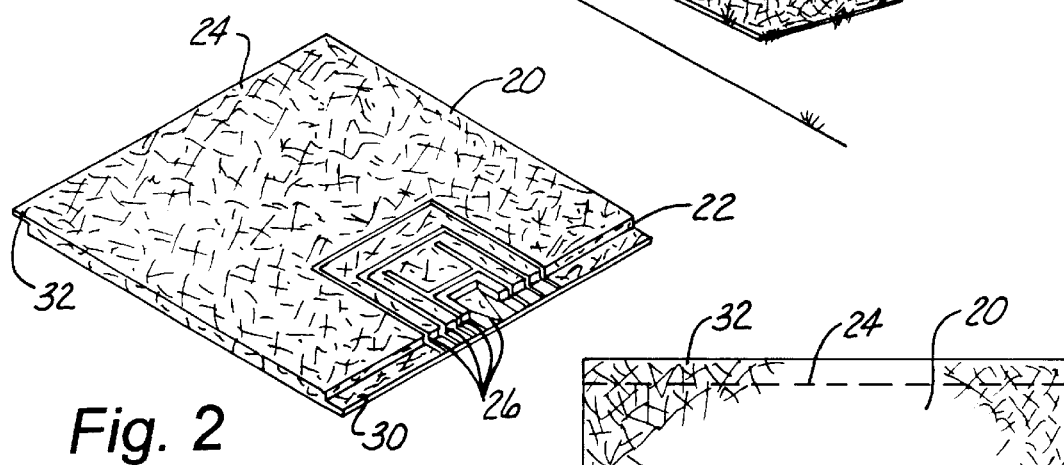
FIG. 2 is a perspective view of the underside of a mat used in the system of the present invention.
Figure 3:
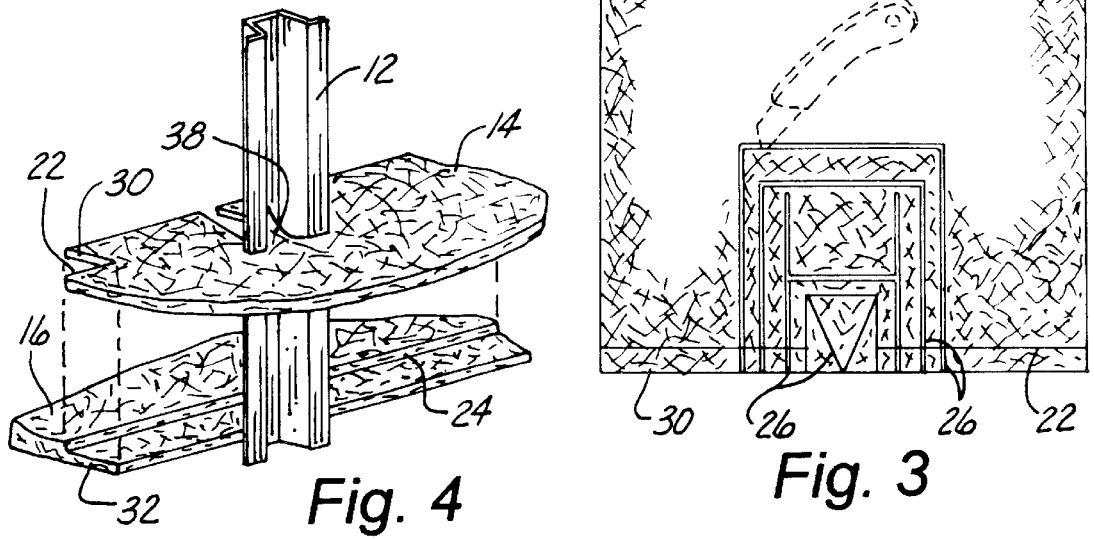
FIG. 3 is a bottom view of the mat in FIG. 2.

Referring now to FIGS. 2 and 3, a first embodiment of a tile (20) constructed in accordance with the system (10) of the present invention is shown. The mat (20) is shown upside down such that the underneath side can be seen. The mat (20) includes a front portion or edge (22) as well as back portion or edge (24). A plurality of predefined score lines (26) are positioned along the front edge (22) of the mat (20). Along the front edge (22) of the mat (20) there is an outwardly extending lip (30). Similarly, along the back edge (24) of the mat (20) there is an outwardly extending lip (32).

Figure 7:
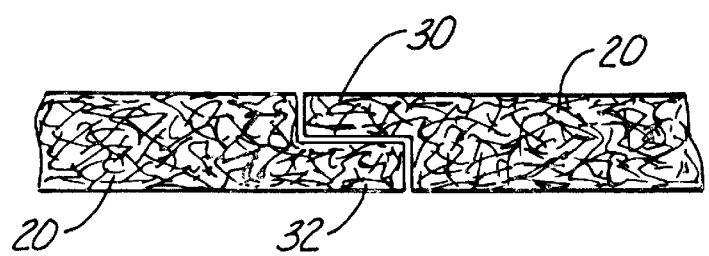
FIG. 7 is a partial side view of the overlap between two anti-vegetation mats utilized in the system of the present invention.

The lips (30 and 32) are configured to be complementary with respect to each other such that when the front edge (22) of a mat is positioned adjacent to a back edge (24) of a mat the lips (30 and 32) will overlap one another. With the lips (30 and 32) overlapped, a seam is created along the adjacent portion of the two mats. A seam of this nature is highly effective at inhibiting growth of vegetation along the seam portion. Additionally, in a preferred embodiment, the lips (30 and 32) are constructed such that the overall thickness of the overlap portion is substantially the same as the thickness of the mats. This feature is illustrated in FIG. 7.

Still referring to FIGS. 2 and 3, while only one predefined score line would be necessary, ideally but not necessarily corresponding to the shape of the extending structure to be surrounded, a plurality of score lines is preferred. Obviously the more score lines which are present, the greater the versatility of the mat with regard to its application. It should be noted, however, that the system of present invention can be utilized even of the shape of the extending structure does not exactly conform to one of the predefined score lines. In this situation, the predefined score lines are used to the extent to which they correspond to the shape of the extending structure. The remaining cuts are then made where necessary. The scores lines assist in make the cuts easier and consistent. However, the mat as constructed can be cut elsewhere when required.

The plurality of score lines define the plurality of shapes and sizes which are expected to be most often encountered. Obviously, depending upon where the system is used and for what purpose, the predefined score lines may take on vastly different configurations. The different uses leading to different configurations clearly are intended to be within the scope of the present invention.

In one embodiment, the plurality of score lines are configured to be utilized along highways and on roadsides. A variety of post sizes and shapes exist. The predefined score lines attempt to accommodate the most common shapes and sizes. In this embodiment, score lines are provided for rectangular posts having dimensions of 3"×5"; 5½"×8"; 8"×8"; and 10"×10". Additionally, a V-shaped score pattern is provided for metal posts, also called delineator posts.

Referring to FIG. 3, a utility knife is shown in dashed lines illustrating how the mat (20) of the present invention can be cut along the score lines (26).

Figure 4:
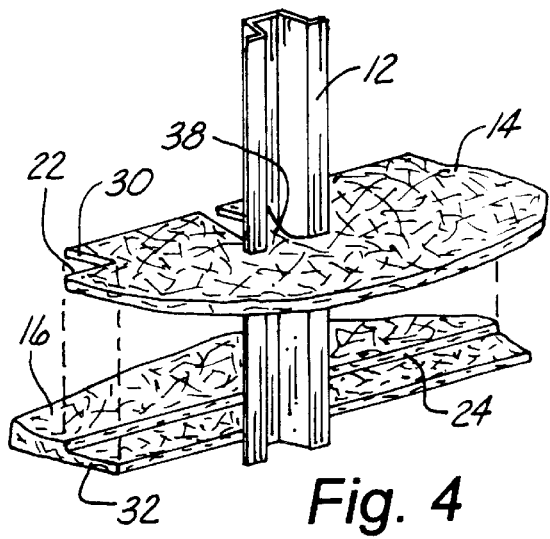
FIG. 4 is a partial perspective view of anti-vegetation system being positioned around a metal post.

Referring to FIG. 4, the system of the present invention is shown being utilized in conjunction with a winged U-shaped metal post (12). Winged U-shaped metal posts, such as post (12), are extensively used. During installation of the system of the present invention, the second mat (16) is positioned on the ground with its back edge (24), via the outwardly extending lip (32), positioned against the post (12). The first mat (14), after being appropriate cut, is the positioned on the ground, around the post (12), with its front edge (22) adjacent to second mat (16). The lip (30) of the first mat (14) overlaps the lip (32) of the second mat (16).

In this illustration, with the post (12) being winged U-shaped, the appropriate score line to cut is the V-shape score line. The V-shape score line is cut but none of the first mat (14) material is removed. After the first mat (14) is positioned on the ground adjacent to the second mat (16), the V-shaped flap (38) formed by the cut can be tucked into the U-shaped portion of the post (12). Because the V-shaped flap (38) is typically longer than the depth of the U-shaped portion, the area inside the U-shaped portion is effectively covered notwithstanding the difference in shape.

Figure 5:
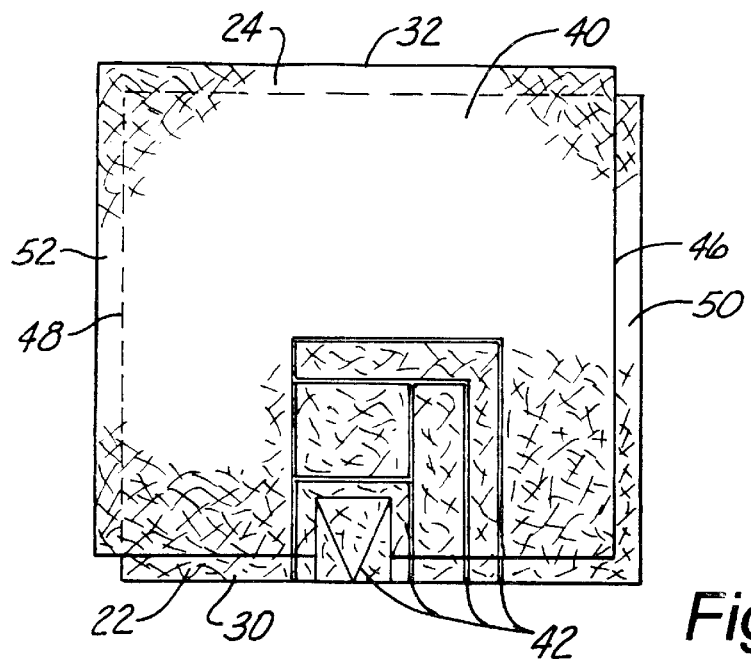
FIG. 5 is a bottom view of another embodiment of a anti-vegetation mat of the system of the present invention.

Referring now to FIG. 5, another embodiment of a mat (40) used in conjunction with the system of the present invention is shown. Like mat (20) described above, mat (40) includes a front edge (22) with an outwardly extending lip (30), and back edge (24) with an outwardly extending lip (32), and a plurality of score patterns (42). As can be seen, however, the score patterns (42) on mat (40) is different from the score patterns (26) on mat (20). Interestingly, the score patterns (42) can accommodate the exact same dimensions as the score pattern (26) discussed above. This further illustrates how the a wide variety of score patterns can be included within the scope of the present invention.

Figure 6:
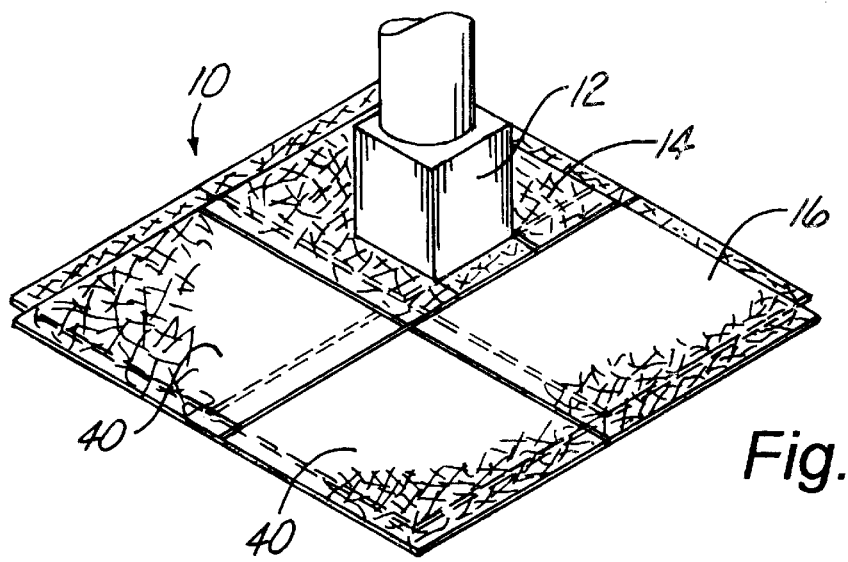
FIG. 6 is a perspective view of plurality of anti-vegetation mats as shown in FIG. 5 shown positioned around a structure extending from the ground.

Mat (40) further includes sides (46 and 48) with corresponding outwardly extending lips (50 and 52). This embodiment permits additional mats to be positioned adjacent to all sides of the first mat and the second mat while maintaining the desirable overlap at all seams. FIG. 6 shows an implementation of the system (10) of the present invention in such a configuration.

Still referring to FIG. 6, a first mat (14) and a second mat (16) have been positioned in accordance with the present invention. In a preferred installation, the second mat (16) would be positioned on the ground. The first mat (14) would be cut along the appropriate rectangular score line, corresponding to the post (12), and the rectangular portion removed. The first mat (14) would then be positioned on the ground, around the post (12), adjacent to the second mat (16). Additional mats (40) can then be positioned adjacent to the first mat (14) and the second mat (16). Utilizing the mat (40) embodiment, it can be seen that all seams comprise overlapping outwardly extending lips which is preferable over the method of simply abutting perpendicular mat edges. There are numerous situations in which it is desirable to utilize additional mats in the system of the present invention. By way of example, additional mats may be utilized to extend the coverage area away from the surrounded post and underneath a fence or guard rail.

The additional mats (40) are both shown on the same side of first mat (14) and second mat (16). Obviously, additional mats could be placed in front, in back and to both sides of all mats, not just first mat (14) and second mat (16). Furthermore, while the mats are shown in a tile pattern, a staggered or brick pattern could likewise be utilized.

Figure 8:
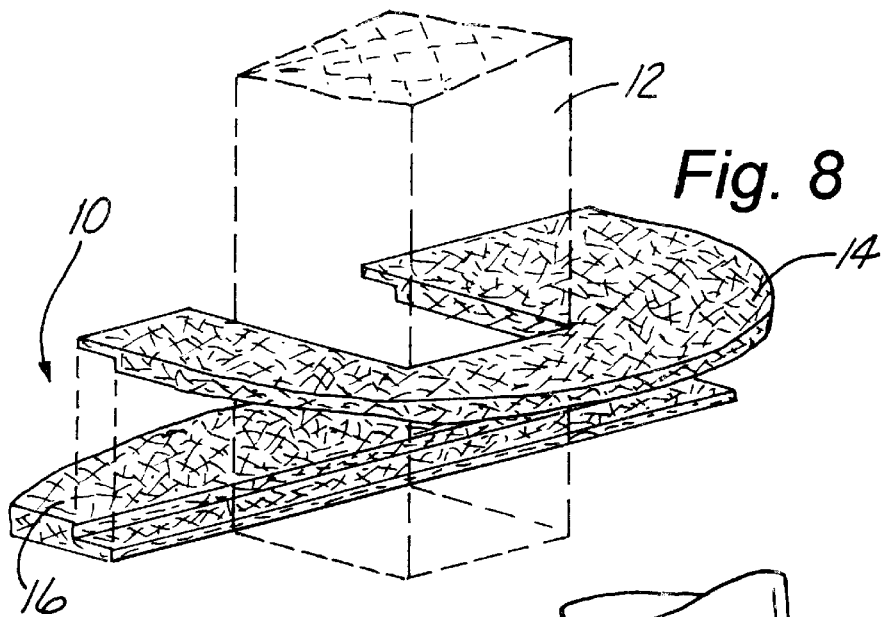
FIG. 8 is a partial perspective view of anti-vegetation system being positioned around a rectangular wooden post.
Figure 9:
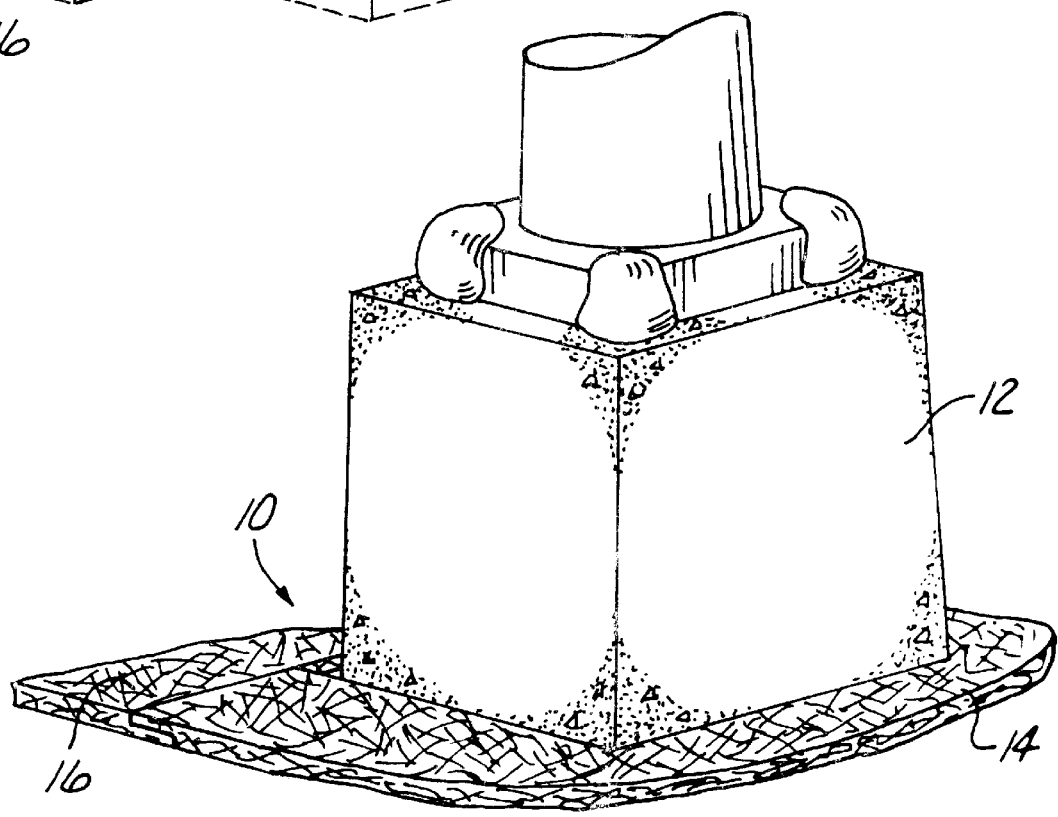
FIG. 9 is a partial perspective view of the system of the present invention shown positioned around a structure extending from the ground.

Referring to FIGS. 8 and 9, the anti-vegetation mat or tile system of the present invention is shown being applied to and in use with a rectangular shaped post (12). As before second mat (16) is positioned on the ground against the post (12). After proper cutting, first mat (14) is positioned on the ground, around the post (12), and adjacent to the second mat (16). It should be noted that the preferred installation of the second mat first is a function of the fact that it is advantages to first place the mat with the lip which lays on the ground followed by the mat with the lip positioned away from the ground and which will overlap with the lip already on the ground. Different mat and lip configurations could easily lead to alternative installations preferences without deviating from the intended scope of the present invention.

A significant advantage of the system of the present invention is that all of the mats, whether being used as the first mat, the second mat or as an additional mat, can be manufactured to be virtually identical. The plurality of score lines can be included on all mats. Additionally, a single extending lip on the outer edge of the mat will not effect the performance of the mat. Therefore, with the system of the present invention, a plurality of identical mats can be used in a variety of situations, can be easily and efficiently installed, and can effectively cover as much ground as desire. All the while utilizing a highly effective overlapping seam which will prevent growth at the adjacent portions.

In a preferred embodiment, the mats of the present invention are molded composite articles. The mats are essentially comprised of a binder and a comminuted or particulate material. The major component of the binder material is a polyurethane material. Polyurethane materials used in the present instance are well known in the art. The use of a polyurethane materials permit the selection various characteristics of the mats such as rigidity. In a preferred embodiment the mats are sufficiently flexible so as to sufficiently contour themselves to the shape of the ground.

A wide variety of comminuted or particulate material may be used in construction of the mats for the present invention. Preferred materials include recycled plastic, rubber and comminuted tire scrap containing reinforcing nylon, glass cords or steel bead wire can be used in the present invention.

In a preferred embodiment, the use comminuted tire scrap has many advantages. Initially, the tire scrap is a minimally desirable recyclable material because it has very limited uses. The steel bead wire can result in a composite product which includes sharp extending wires which can poke and cut anyone handling the products without proper care. These traditional downside make the tire scrap ideal for the current use. The tire scrap can be considerably less expensive because of the low demand and limited uses. The resulting mats become less desirable for use outside its intended purpose, which deters theft. Finally, the roughness provides the benefit of holding the mat in place.

Related to this point, it is desirable to construct the mats such that they are of sufficient thickness and weight whereby they need not be anchored. While thickness and weight densities can vary greatly depending upon the applications and particulate material utilized, experimentation has shown that a weight density of approximately four pounds per square foot is typically sufficient to provide a mat which is sufficiently heavy to eliminate the need for anchoring and preventing movement of the mat such as sliding or lifting by a mower.

Nevertheless, other particulate materials may be made into composite moldings suitable for other applications. These particulate materials may include comminuted plastics such as polyester, nylon, polyurethane, acrylic, ABS, polstyrene, rayon, cellulose, etc. These materials may be thermoplastic or thermoset and can be obtained from unfilled plastics and synthetics as well as those that contain reinforcing fillers or other materials such as fiberglass, mica, talc, flake glass, carbon fibers, etc.

Obviously, virtually any comminuted or particulate recycled material could be utilized in the construction of the mats of the present invention without deviating from the intended scope of the invention.

Mineral fillers may also be incorporated into the present invention such as calcium carbonate, clay, carbon black aluminum oxide, feldspar, etc. In addition, particulate materials useful in the suppression of flame and smoke and combustion modification may be used. These would include but are not limited to, aluminum trihydrate, antimony oxide, zinc porate malybdenum compounds, phosphates, etc.

Organic fillers may also be used in accordance with the present invention. Suitable materials would be wood flour, sawdust and shavings, shell fibers, cotton fibers, hemp, spent beer grain, corn cobs, cork, furfural residues, soybean meal, various starches, wool fibers, etc.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

We claim:

1. An anti-vegetation system for retarding growth around a structure extending from the ground, said structure including an outer periphery, comprising:
    a plurality of mats, wherein said mats are generally planer in shape;
    wherein said plurality of mats includes a first mat, wherein said first mat comprises:
        an outer periphery, said outer periphery including a front portion,
        at least one predefined scoring pattern disposed along said front portion,
        wherein said at least one predefined scoring pattern defines a shape which corresponds to a portion of the out periphery of the structure extending from the ground, and
        wherein when said at least one predefined scored shape is cut, and said portion optionally removed, the mat can be positioned on the ground and partially around the structure extending from the surface; and
    wherein said plurality of mats includes a second mat, wherein said second mat comprises:

an outer periphery, said outer periphery including a back portion, wherein said back portion is shaped to generally correspond to said front portion of said first mat, wherein when said second mat is positioned on the ground with said front portion of said first mat adjacent to said back portion of said second mat, said first mat and second mat effectively surround said structure extending from the ground;

wherein said front portion of said first mat includes an outwardly extending lip;

wherein said back portion of said second mat includes an outwardly extending lip; and wherein said outwardly extending lip of said first mat and said outwardly extending lip of said second mat are configured such that the outwardly extending lips overlap one another when said front portion of said first mat is positioned adjacent to said back portion of said second mat.

2. The anti-vegetation system of claim 1 wherein said overlapping outwardly extending lips comprise an overlap portion, said overlap portion being substantially the same thickness as the thickness of said first and said second mat.

3. The anti-vegetation system of claim 2 wherein said at least one predefined scoring pattern disposed along said front portion comprises a plurality of predefined score lines for accommodating a variety of sizes and shapes of said structure extending from said ground.

4. The anti-vegetation system of claim 3:
wherein each of said plurality of mats include a top surface and a bottom surface; and
wherein said plurality predefined scoring patterns are disposed on said bottom surface of said first mat.

5. The anti-vegetation system of claim 2:
wherein said outer periphery of said first mat includes a back portion;
wherein said back portion of said first mat is shaped substantially the same as said back portion of said second mat;
wherein said outer periphery of said second mat includes a front portion;
wherein said front portion of said second mat is shaped substantially the same as said front portion of said first mat;
wherein said back portion of said first mat includes an outwardly extending lip; and
wherein said front portion of said second mat include an outwardly extending lip.

6. The anti-vegetation system of claim 5 including at least one predefined scoring pattern disposed along said front portion of said second mat.

7. The anti-vegetation system of claim 6 wherein said first mat and said second mat are substantially identical in shape and configuration.

8. The anti-vegetation system of claim 2:
wherein each of said plurality of mats include a top surface and a bottom surface; and
wherein said at least one predefined scoring pattern disposed along said front portion is disposed on said bottom surface of said first mat.

9. The anti-vegetation system of claim 1:
wherein each of said plurality of mats include a top surface and a bottom surface; and
wherein said at least one predefined scoring pattern disposed along said front portion is disposed on said bottom surface of said first mat.

10. The anti-vegetation system of claim 1 wherein said at least one predefined scoring pattern disposed along said front portion comprises a plurality of predefined score lines for accommodating a variety of sizes and shapes of said structure extending from said ground.

11. The anti-vegetation system of claim 1 wherein said plurality of predefined score lines includes a V-shaped score line for accommodating a metal post.

12. The anti-vegetation system of claim 1 wherein said at least one predefined scoring pattern comprises a V-shaped score line for accommodating a metal post.

13. The anti-vegetation system of claim 1:
wherein said outer periphery of said first mat includes a back portion;
wherein said back portion of said first mat is shaped substantially the same as said back portion of said second mat;
wherein said outer periphery of said second mat includes a front portion;
wherein said front portion of said second mat is shaped substantially the same as said front portion of said first mat;
wherein said back portion of said first mat includes an outwardly extending lip; and
wherein said front portion of said second mat include an outwardly extending lip.

14. The anti-vegetation system of claim 13 including at least one predefined scoring pattern disposed along said front portion of said second mat.

15. The anti-vegetation system of claim 14 wherein said first mat and said second mat are substantially identical in shape and configuration.

16. An anti-vegetation system for retarding growth around a structure extending from the ground, said structure including an outer periphery, comprising:
a plurality of mats, wherein said mats are generally planer in shape;
wherein said plurality of mats includes a first mat, wherein said first mat comprises:
an outer periphery, said outer periphery including a front portion,
at least one predefined scoring pattern disposed along said front portion,
wherein said at least one predefined scoring pattern defines a shape which corresponds to a portion of the outer periphery of the structure extending from the ground, and
wherein when at least one predefined scored shape is cut, and said portion optionally removed, the mat can be positioned on the ground and partially around the structure extending from the surface; and
wherein said plurality of mats includes a second mat, wherein said second mat comprises:
an outer periphery, said outer periphery including a back portion,
wherein said back portion is shaped to generally correspond to said front portion of said first mat,
wherein when said second mat is positioned on the ground with said front portion of said first mat adjacent to said back portion of said second mat, said first mat and second mat effectively surround said structure extending from the ground;
wherein said outer periphery of said first mat includes a back portion;
wherein said back portion of said first mat is shaped substantially the same as said back portion of said second mat;

wherein said outer periphery of said second mat includes a front portion;

wherein said front portion of said second mat is shaped substantially the same as said front portion of said first mat;

wherein said back portion of said first mat includes an outwardly extending lip;

wherein said front portion of said second mat includes an outwardly extending lip;

wherein said outer periphery of said first mat includes a first side portion and a second side portion;

wherein each of said first side portion and said second side portion of said first mat is positioned between said front portion and said back portion;

wherein each of said first side portion and said second side portion of said first mat includes an outwardly extending lip;

wherein said outer periphery of said second mat includes a first side portion and a second side portion;

wherein each of said first side portion and said second side portion of said second mat is positioned between said front portion and said back portions; and wherein each of said first side portion and said second side portion of said second mat includes and outwardly extending lip.

17. The anti-vegetation system of claim 16:

wherein said plurality of mats includes a third mat, wherein said third mat comprises:

an outer periphery, said outer periphery including a front portion, a back portion, a first side portion and a second side portion, said first side portion and said second side portion positioned between said front portion and said back portion;

wherein each of said front portion, said back portion, said first side portion and said second side portion includes and outwardly extending lip; and wherein said first side outwardly extending lips of said first, second and third mats are configured to overlap with said second side outwardly extending lips of said first, second and third mats.

18. The anti-vegetation system of claim 17 wherein all overlapping outwardly extending lips of adjacent maps comprise overlap portions, said overlap portions being substantially the same thickness as the thickness of said first and said second mat.

19. The anti-vegetation system of claim 18 wherein each of said plurality of mats are substantially identical in shape and configuration.

\* \* \* \* \*